United States Patent
Beall et al.

(10) Patent No.: US 10,095,928 B2
(45) Date of Patent: Oct. 9, 2018

(54) METHODS AND SYSTEMS FOR MARKER IDENTIFICATION

(71) Applicant: WorldViz, Inc., Santa Barbara, CA (US)

(72) Inventors: Andrew C. Beall, Santa Barbara, CA (US); Matthias Pusch, Bavaria (DE)

(73) Assignee: WORLDVIZ, INC., Santa Barbara, CA (US)

( * ) Notice: Subject to any disclaimer, the term of this patent is extended or adjusted under 35 U.S.C. 154(b) by 105 days.

(21) Appl. No.: 15/385,557

(22) Filed: Dec. 20, 2016

(65) Prior Publication Data

US 2017/0177939 A1 Jun. 22, 2017

Related U.S. Application Data

(60) Provisional application No. 62/270,773, filed on Dec. 22, 2015.

(51) Int. Cl.
| | | |
|---|---|---|
| *G06K 9/20* | (2006.01) | |
| *G06K 9/00* | (2006.01) | |
| *G06T 7/62* | (2017.01) | |

(52) U.S. Cl.
CPC ....... *G06K 9/00671* (2013.01); *G06K 9/2018* (2013.01); *G06K 9/2063* (2013.01); *G06T 7/62* (2017.01); *G06T 2207/10048* (2013.01); *G06T 2207/30204* (2013.01)

(58) Field of Classification Search
CPC ............. G06K 9/00671; G06K 9/2018; G06K 9/2063; G06T 7/62; G06T 2207/30204; G06T 2207/10048
See application file for complete search history.

(56) References Cited

U.S. PATENT DOCUMENTS

| | | |
|---|---|---|
| 6,574,352 B1 | 6/2003 | Skolmoski |
| 6,720,949 B1 | 4/2004 | Pryor et al. |
| 7,719,484 B2 | 5/2010 | Turner et al. |
| 8,472,120 B2 | 6/2013 | Border et al. |
| 8,482,859 B2 | 7/2013 | Border et al. |
| 8,570,378 B2 | 10/2013 | Zalewski et al. |
| 9,110,503 B2 | 8/2015 | Beall et al. |
| 2002/0036617 A1 | 3/2002 | Pryor |
| 2008/0219566 A1* | 9/2008 | Teoh ............... G06F 3/0325 382/225 |
| 2008/0310714 A1* | 12/2008 | Stern ................ G06T 5/009 382/169 |
| 2010/0311512 A1 | 12/2010 | Lock et al. |

(Continued)

OTHER PUBLICATIONS

U.S. Appl. No. 62/331,296, filed May 3, 2016, Pusch et al.

(Continued)

*Primary Examiner* — Carol Wang
(74) *Attorney, Agent, or Firm* — Knobbe, Martens, Olson & Bear LLP

(57) ABSTRACT

A marker tracking system configured to detect light patterns (e.g., infrared light patterns) generated by one or more markers is described. A given marker is configured with a code which identifies the marker in a motion tracking camera field of view. Motion tracking camera(s) record the emitted infrared light and are configured to directly, or in conjunction with an associated computing device, computationally distinguish a given marker with high accuracy and efficiently.

20 Claims, 5 Drawing Sheets

(56) References Cited

U.S. PATENT DOCUMENTS

| | | | |
|---|---|---|---|
| 2012/0156652 A1 | 6/2012 | Lane et al. | |
| 2012/0178054 A1 | 7/2012 | Jomander et al. | |
| 2012/0194419 A1 | 8/2012 | Osterhout et al. | |
| 2012/0194420 A1 | 8/2012 | Osterhout et al. | |
| 2012/0194549 A1 | 8/2012 | Osterhout et al. | |
| 2012/0194551 A1 | 8/2012 | Osterhout et al. | |
| 2012/0194552 A1 | 8/2012 | Osterhout et al. | |
| 2012/0200601 A1 | 8/2012 | Osterhout et al. | |
| 2012/0206334 A1 | 8/2012 | Osterhout et al. | |
| 2012/0212406 A1 | 8/2012 | Osterhout et al. | |
| 2012/0212499 A1 | 8/2012 | Haddick et al. | |
| 2013/0050426 A1* | 2/2013 | Sarmast | G01S 17/89 348/46 |
| 2013/0223679 A1* | 8/2013 | Russ | G06T 7/004 382/103 |
| 2014/0064552 A1* | 3/2014 | Miyagi | G06K 9/00624 382/103 |
| 2014/0152550 A1 | 6/2014 | Beall | |
| 2014/0361956 A1 | 12/2014 | Mikhailov | |
| 2015/0193018 A1 | 7/2015 | Venable et al. | |
| 2015/0235434 A1 | 8/2015 | Miller | |
| 2015/0346327 A1 | 12/2015 | Beall et al. | |
| 2016/0129346 A1 | 5/2016 | Mikhailov | |
| 2016/0140930 A1 | 5/2016 | Pusch et al. | |
| 2016/0266644 A1 | 9/2016 | Yamamoto | |

OTHER PUBLICATIONS

U.S. Appl. No. 14/971,720, filed Dec. 16, 2015, Lashkari et al.
U.S. Appl. No. 15/376,118, filed Dec. 12, 2016, Beall et al.
"The WorldViz wireless 6Dof Wand controller is used to navigate in and interact within the 3D model," architecture interactive, 2 pages, 2012.
Ambisonic 3D Auralizer System, WorldViz, LLC, 2 pages, Sep. 27, 2014, https://web.archive.org/web/20140927060932/http:/www.worldviz.com/products/ambisonic.
Augmented Reality, WorldViz, LLC, 3 pages, Sep. 27, 2014, https://web.archive.org/web/20140927061320/http:/www.worldviz.com/products/augmented-reality.
Head Mounted Displays, WorldViz, LLC, 2 pages, Sep. 26, 2014 https://web.archive.org/web/20140926011241/http://www.worldviz.com/products/head-mounted-displays.
Motion Tracking, World Viz, 4 pages, 2012.
Other VR Hardware, WorldViz, LLC, 15 pages, Sep. 27, 2014, https://web.archive.org/web/20140927061334/http://www.worldviz.com/products/other-vr-hardware.
Precision Position Tracking for Virtual Reality, WorldViz, LLC, 2 pages, Oct. 24, 2014, https://web.archive.org/web/20141024142530/http:/www.worldviz.com/products/ppt.
Vizard Virtual Reality Software Toolkit, 2 pages, Sep. 26, 2014, https://web.archive.org/web/20140924064245/http:/www.worldviz.com/products/vizard.

* cited by examiner

METHODS AND SYSTEMS FOR MARKER IDENTIFICATION

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD

The present invention relates to systems and methods for determining a position and identity of infrared tracking markers used in association with virtual reality and/or augmented reality simulations.

BACKGROUND

Virtual Reality (VR) comprises a computer simulated environment that can simulate a physical presence in places in the real world or imagined worlds. Conventionally, virtual reality environments are primarily visual experiences, displayed on a screen (e.g., and viewed by a user using 3D glasses) or through special stereoscopic display head gear. The simulated environments can be similar to the real world in order to create lifelike experiences or it differs significantly from reality, such as in VR games.

Augmented Reality (AR) generally refers to a computer simulated environment combined with the real world. Conventionally, the elements of the real world are augmented with computer generated graphics. Often, translucent stereoscopic headsets are worn by the user in AR simulations to enable a wearer to view the real world through the headset while also being able to view computer generated graphics.

Movement of participants and/or objects in interactive VR and AR simulations are optionally tracked using various methods and devices.

SUMMARY

An aspect of the disclosure relates to an example marker identification and position tracking system configured to interface and work in conjunction with a marker device and camera system and to provide high fidelity tracking of user and object motion in a virtual and/or augmented reality experience.

An aspect of the disclosure relates to a marker identification system comprising: a motion tracking camera, wherein the motion tracking camera is configured to detect infrared light; a marker, the marker configured to emit a pattern of infrared light pulses that encodes 5 or more binary bits; a computing system comprising: a computing device; and non-transitory media that stores instructions readable by the computing device, that when executed by the computing device, cause the computing system to: record via the motion tracking camera a plurality of images including at least a first recorded image set, a second recorded image set, a third recorded image set, a fourth recorded image set, and a fifth recorded image set; identify within a given recorded image of the first recorded image set a cluster of adjacent pixels corresponding to infrared light emitted from the marker; determine a count of how many saturated pixels are within a given identified cluster of adjacent pixels of a given recorded image of the first recorded image set; determine a highest count of saturated pixels from respective counts of saturated pixels of respective given identified clusters of respective given recorded images of the first recorded image set; calculate a radius for a circular perimeter by at least multiplying the highest count of saturated pixels by a first factor; identify a first area, bounded by the circular perimeter, of a first image of the first recorded image set encompassing a highest number of infrared light pixels within a cluster of adjacent pixels; for pixels within the first area, identify a first set of pixels having a relatively highest intensity as compared to other sets of pixels in the first area, wherein the first set of pixels has a count equal to the highest count of saturated pixels; excluding the first set of pixels, determine a sum of infrared light intensities of the first area; determine respective sum of infrared light intensities for respective areas in the remaining one or more images of the first recorded image set; based at least in part on the determined sum of infrared light intensities of the respective areas of the respective images of the first recorded image set, assign a binary value to the first recorded image set; determine respective sum of infrared light intensities for respective areas in at least the second recorded image set, the third recorded image set, the fourth recorded image set, and the fifth recorded image set; based at least in part on the determined respective sum of infrared light intensities for respective areas in the second recorded image set, the third recorded image set, the fourth recorded image set, and the fifth recorded image set, assign a respective binary value to the respective second recorded image set, third recorded image set, fourth recorded image set, and fifth recorded image set; compare the respective assigned binary values to the configured pattern of infrared light pulses of the marker; and based at least in part on the comparison of the respective assigned binary values to the configured pattern of infrared light pulses of the marker, identify the marker.

An aspect of the disclosure relates to a system comprising: a motion tracking camera, wherein the motion tracking camera is configured to detect infrared light; a marker, the marker configured to emit a binary pattern of infrared light pulses that encodes one or more binary bits; a computing system comprising: a computing device; and non-transitory media that stores instructions readable by the computing device, that when executed by the computing device, cause the computing device to: record via the motion tracking camera a plurality of images; identify within a given recorded image a cluster of adjacent pixels corresponding to infrared light emitted from the marker; determine a count of how many saturated pixels are within a given identified cluster of adjacent pixels of a given recorded image; determine a highest count of saturated pixels from respective counts of saturated pixels of respective given identified clusters of respective given recorded images; calculate a radius for a circular perimeter by at least multiplying the highest count of saturated pixels by a first factor; identify a first area, bounded by the circular perimeter, of a first image of the plurality of images encompassing a highest number of infrared light pixels within a cluster of adjacent pixels; for pixels within the first area, identify a first set of pixels having a relatively highest intensity as compared to other sets of pixels in the first area, wherein the first set of pixels has a count equal to the highest count of saturated pixels; excluding the first set of pixels, determine a sum of infrared light intensities of the first area; determine respective sum of infrared light intensities for respective areas in the remaining one or more images of the plurality of images; and based at least in part on the determined sum of infrared light intensities of the respective areas of the respective images of the plurality of recorded images, assign a binary value to the plurality of images.

An aspect of the disclosure relates to method of marker identification comprising: identifying within a given recorded image of a plurality of images captured by camera a cluster of adjacent pixels corresponding to infrared light emitted from a marker; determining a count of how many saturated pixels are within a given identified cluster of adjacent pixels of a given recorded image of the plurality of images; determining a highest count of saturated pixels from respective counts of saturated pixels of respective given identified clusters of respective given recorded images; calculating a radius for a circular perimeter by at least multiplying the highest count of saturated pixels by a first factor; identifying a first area, bounded by the circular perimeter, of a first image of the plurality of images encompassing a highest number of infrared light pixels within a cluster of adjacent pixels; for pixels within the first area, identifying a first set of pixels having a relatively highest intensity as compared to other sets of pixels in the first area, wherein the first set of pixels has a count equal to the highest count of saturated pixels; excluding the first set of pixels, determining a sum of infrared light intensities of the first area; determining respective sum of infrared light intensities for respective areas in the remaining one or more images of the plurality of images; and based at least in part on the determined sum of infrared light intensities of the respective areas of the respective images of the plurality of recorded images, assigning a binary value to the plurality of images.

An aspect of the disclosure relates to a system comprising: a motion tracking camera, wherein the motion tracking camera is configured to detect infrared light; a marker, the marker configured to emit a binary pattern of infrared light pulses that encodes one or more binary bits; a computing system comprising: a computing device; and non-transitory media that stores instructions readable by the computing device, that when executed by the computing device, cause the computing device to: record via the motion tracking camera a plurality of images; identify within a given recorded image a cluster of adjacent pixels corresponding to infrared light emitted from the marker; determine a count of how many saturated pixels are within a given identified cluster of adjacent pixels of a given recorded image; determine a highest count of saturated pixels from respective counts of saturated pixels of respective given identified clusters of respective given recorded images; determine a perimeter using the highest count of saturated pixels; identify a first area, bounded by the perimeter, of a first image of the plurality of images encompassing a highest number of infrared light pixels within a cluster of adjacent pixels; for pixels within the first area, identify a first set of pixels having a relatively highest intensity as compared to other sets of pixels in the first area, wherein the first set of pixels has a count equal to the highest count of saturated pixels; excluding the first set of pixels, determine a sum of infrared light intensities of the first area; determine respective sum of infrared light intensities for respective areas in the remaining one or more images of the plurality of images; and based at least in part on the determined sum of infrared light intensities of the respective areas of the respective images of the plurality of recorded images, assign a binary value to the plurality of images.

An aspect of the disclosure relates to method of marker identification comprising: identifying within a given recorded image of a plurality of images captured by camera a cluster of adjacent pixels corresponding to infrared light emitted from a marker; determining a count of how many saturated pixels are within a given identified cluster of adjacent pixels of a given recorded image of the plurality of images; determining a highest count of saturated pixels from respective counts of saturated pixels of respective given identified clusters of respective given recorded images; determining a perimeter using the highest count of saturated pixels by a first factor; identifying a first area, bounded by perimeter, of a first image of the plurality of images encompassing a highest number of infrared light pixels within a cluster of adjacent pixels; for pixels within the first area, identifying a first set of pixels having a relatively highest intensity as compared to other sets of pixels in the first area, wherein the first set of pixels has a count equal to the highest count of saturated pixels; excluding the first set of pixels, determining a sum of infrared light intensities of the first area; determining respective sum of infrared light intensities for respective areas in the remaining one or more images of the plurality of images; and based at least in part on the determined sum of infrared light intensities of the respective areas of the respective images of the plurality of recorded images, assigning a binary value to the plurality of images.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
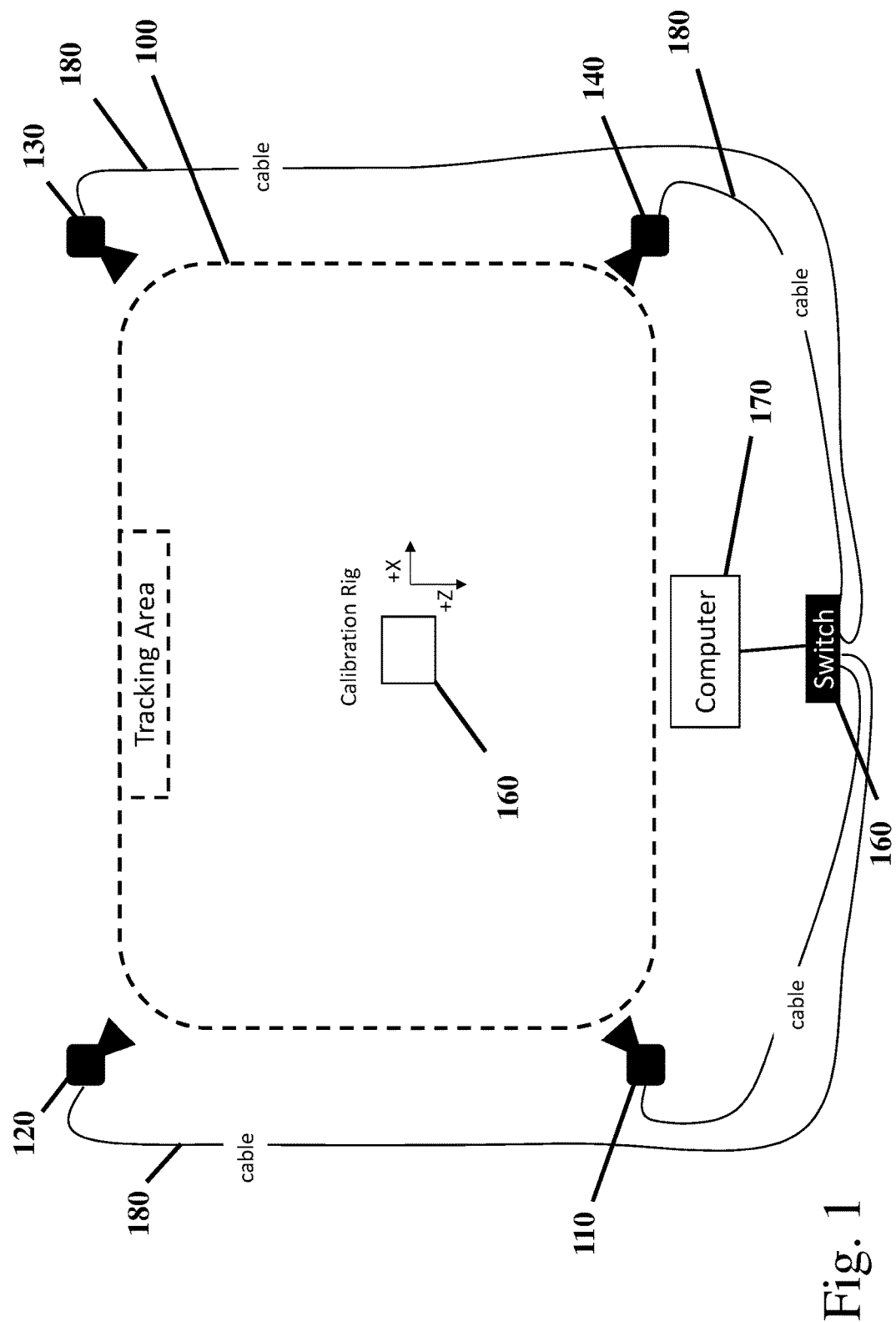
FIG. 1 illustrates an example operating environment of a tracking system.

An aspect of this disclosure relates generally to devices and methods for enabling high fidelity motion tracking in a virtual or augmented reality experience, and in particular, to a marker identification system which works in conjunction with a motion capture tracking element (e.g., an infrared motion capture tracking element).

Advantageously, virtual/augmented reality and/or simulated environments as described herein can optionally be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, virtual reality as described herein may also be used in augmented reality environments, including for example, in an automotive virtual reality environment.

Certain marker identification systems used in virtual and augmented reality tracking systems use infrared light. Advantageously, infrared light is invisible to human eyes and, thus, is not distracting to simulation participants and/or operators. Further, infrared light is relatively easy to record and the emitted and/or reflected light can be distinguished (e.g., via image processing) in recorded images. However, other wavelengths/colors and light types may be used. Conventionally, infrared marker identification systems used in virtual and augmented reality environments use reflective or active markers.

With respect to the use of reflective markers, a given camera may have an infrared light emitting strobe attached to or integrated with an infrared sensitive camera. The infrared light emitted from the strobe reflects off one or markers attached to or associated with a subject or object and is received at the camera. The marker reflections may appear in the camera image as bright circular shapes in a recorded tracking area, herein after referred to as an "infrared blob" or simply "blob."

To track an object, markers may be placed (e.g., with adhesive, clip, tape, magnets, snaps, sewn on, or otherwise placed/affixed) on an object to be tracked. For example, three markers or more markers may be utilized in order to track an object in 6 degrees of freedom, x-axis, y-axis, z-axis, pitch, yaw, roll. If more than one subject (wherein the subject may be a moveable object) is to be tracked in a given tracking area, the plurality of markers may be placed in unique patterns on the subject, if each marker in a set of markers is not by itself distinguishable from the rest of the markers. A unique reflected pattern recorded in the video images enables the system via certain calculations and/or algorithms to determine at a given moment (e.g., video frame or set of frames) the location and/or orientation of the subject to which the markers are attached.

With respect to the active marker system, pulsed light (e.g., infrared light) is emitted from a given active marker as to provide tracking and identification information. Advantageously, a given marker in a tracking field may optionally be configured to emit a unique identifier wherein the identifier is defined by a unique pattern of pulsed light. Thus, for example, an active marker using an 8-bit binary encoding can encode 256 markers, a 5-bit binary encoding can encode 32 markers, etc. Other active marker systems may also be used, including, for example, a marker system in which only a single marker in a set of markers is emitting light at any given time period (e.g., a video frame or a set of frames). This optional active marker systems may have reduced tracking smoothness relative to the active marker with integrated marker identification, as the camera system may need to record each marker binary encoded pattern (e.g., one marker identification per frame or frame set) in the system of markers before returning to the first marker.)

While both an infrared light reflecting system of markers and an infrared light emitting system of markers can be used in certain Virtual/Augmented reality simulations, an infrared light emitting tracking system may have certain advantageous over a reflective system when tracking multiple subjects in a tracking area. For example, the reflective systems may need to track a larger number of markers and may need to further track patterns, increasing the likelihood of two or more marker patterns traversing across each other when the markers are in close proximity to each other causing marker confusion (e.g., marker swapping). In addition, in a reflective marker system, as the number of subject/objects in a tracking area increase, the number of markers needed to create distinguishable patterns may increase. Having several markers in a cluster in close proximity to each other can decrease tracking quality as the tracking cameras may not see each marker clearly in a cluttered marker environment.

Aspects of the disclosure relates to an example tracking system configured to detect light patterns (e.g., infrared light patterns) generated/emitted by one or more markers, wherein the light patterns emitted by a given marker represents a unique code which identifies individual tracking markers in a motion tracking camera field of view. The motion tracking cameras detecting the emitted infrared patterns are configured to directly, or in conjunction with an associated computing device, computationally distinguish a given marker with high accuracy and efficiently as described herein.

In an example embodiment, one or more motion tracking cameras are positioned to video record a tracking area 100 with one or more participants in a single or multiuser virtual reality or augmented reality simulation as illustrated in FIG. 1. Optionally, each tracking camera 110-140 is positioned in each of four corners of a square or rectangular tracking area with the camera lens pointing inward as illustrated in FIG. 1. Optionally, a given tracking camera 110-140 is elevated above the tracking area (e.g., via tripods, affixed to walls, etc.) with the tracking cameras lens directed in a slight downward angle, enabling an improved view of infrared emitting tracking devices (e.g., a tracking device affixed to a head mounted display of a user) and/or markers. Optionally, a given tracking camera is connected to a data network 150 formed via cabling (e.g., Ethernet cabling 180) and an Ethernet Switch 160. Optionally, a computing device/server 170 is connected, for example via a network interface card and cable, to the data network 150. Optionally, the tracking cameras 110-140 are wirelessly connected to the computing device 170.

An example tracking device which emits trackable infrared light signatures is a wireless Precision Position Tracking (PPT) device, PPT Eyes™, from WorldViz LLC of Santa Barbara. PPT Eyes is a motion tracker used in virtual or augmented reality environments which provides wide-area tracking and can be integrated with or attached to display headgear enabling the tracking of a user's head and/or body movements when combined with virtual reality tracking software.

Other features of a head mountable wireless PPT device may include some or all of the following features: a power button on top (or elsewhere) for easy user access; a housing imprinted with LED identifiers (e.g., LED1:1 and LED2:R) for clarity with signal identifier codes; a rechargeable (e.g., lithium ion) battery with an optional endurance of 4, 6, or 8 hours (e.g., with low intensity setting) with an optional range of more than 20 meters (e.g., with high intensity setting) without impacting performance; optionally factory or self-mounted onto commercially available passive and active 3D glasses; automatic "go-to-sleep" mode if not moved for a first period of time (e.g., 30 seconds), and turn off after a second period of times (e.g., 10 minutes) to save on battery power; user switchable between USB charge mode and USB power mode; easily reprogrammable device settings (sleep mode and turn-off timer periods, LED Identifiers, LED light intensity) via an application (or via software toolkit from WorldViz LLC of Santa Barbara) wherein the device is connected to a user's computer via a wired or wireless interface (e.g., a micro USB port); compatible with a plurality of protocols (e.g., TrackD, VRPN, WorldViz PPT Studio™, etc.); six degrees-of-freedom (X, Y, Z, yaw, pitch, roll) enabling the full determination of left/right eye locations needed for stereoscopic viewing; angular range of a full 360 degrees—all axis; tracking precision of approximately less than a quarter of a millimeter over a 3 meter by 3 meter by 3 meter volume with a rotation precision of 0.09 degrees; position accuracy of approximately less than a quarter of a millimeter over a 3 meter by 3 meter by 3 meter volume with a rotation accuracy of one degree RMS yaw, one quarter of a degree RMS roll; update rate of 180 Hz); latency of no more than 20 milliseconds; light weight 30 grams (with two infrared red diffusion balls); device size of 203 by 14 by 32 millimeters; active LED mode (PPT Marker IDs). It is understood that dimensions, ranges, and components, other than those recited above, may be used, such as those discussed with respect to other embodiments.

In an example embodiment, a two marker tracker such as PPT Eyes may be used in conjunction with motion tracking cameras to identify a tracking device position in space and by association, the head position of and movement of a user who may have affixed the tracker to their head mounted display. A given marker in this example comprises an infrared Light Emitting Diode (LED). A given LED generates a different light intensity based upon the amount of current/voltage applied by the tracking device to the LED. For example, if a low voltage (e.g., 1.25 volts) is applied to the LED, a low intensity emission is detected and/or measured by a plurality of tracking cameras. A higher voltage (e.g., 5 volts) applied to the LED results in a higher detected and/or measured emission intensity. Optionally, various voltages (e.g., 1.25, 2.5, 3.75, 5, etc.) when applied to the LED result in different detectable and/or measurable emission intensities. A detected and measured pattern of varying intensities of infrared light may be used to identify a marker from a set of markers in a camera field of view as further described herein.

A marker may be configured to receive various applied voltages in order to generate a Pulse Width Modulation (PWM) signal or pattern (e.g., phase encoded optical Manchester code) or other detectable/measurable decodable pattern. In an example embodiment, a cyclic binary code is generated by an infrared LED using PWM provided by a PWM device. The use of cyclic codes have certain advantages over certain other binary codes in that cyclic codes may be shorter in length (e.g., by not including a start and stop bit) and signal detection may occur at any given time during a signal period. Optionally, in this embodiment, the binary cyclic code used is one in which one clock period is used to send 1 bit of information wherein a 1 is defined as a low to high intensity transition and a 0 as steady state normal intensity. As further described below, a clock period optionally comprises a series of frames or a frame set, for example, a frame set of 6 frames. Optionally, if 8 unique marker identifiers are needed, this can be achieved with high accuracy using 5 bits as illustrated in Table 1.

TABLE 1

| Identifier | 5-Bit Binary Code |
|---|---|
| 1 | 00000 |
| 2 | 00001 |
| 3 | 00011 |
| 4 | 00101 |
| 5 | 00111 |
| 6 | 01011 |
| 7 | 01111 |
| 8 | 11111 |

Figure 2:
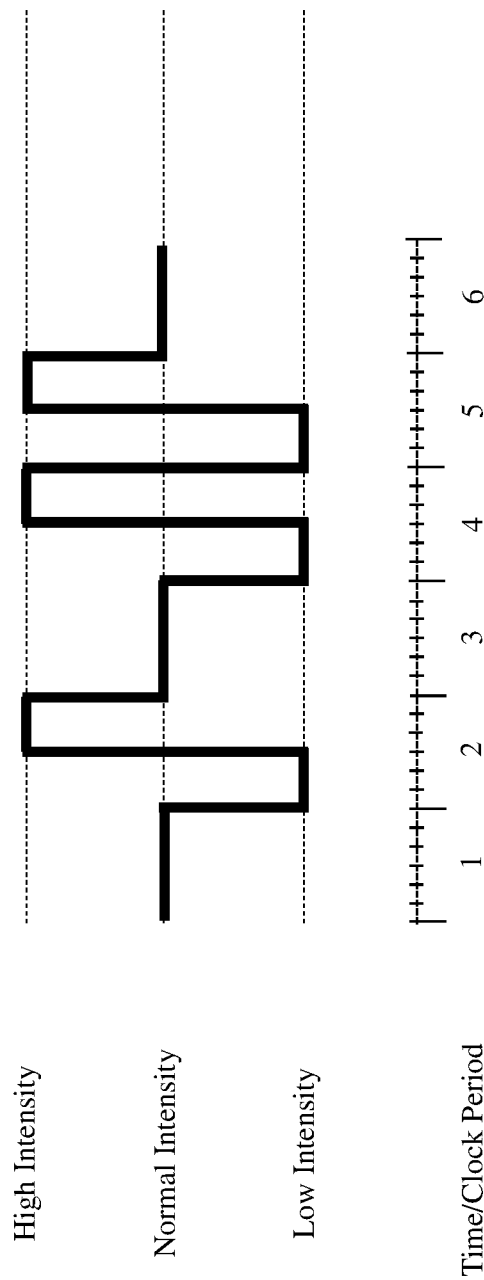
FIG. 2 illustrates an example recorded light intensity signal.
Figure 3:
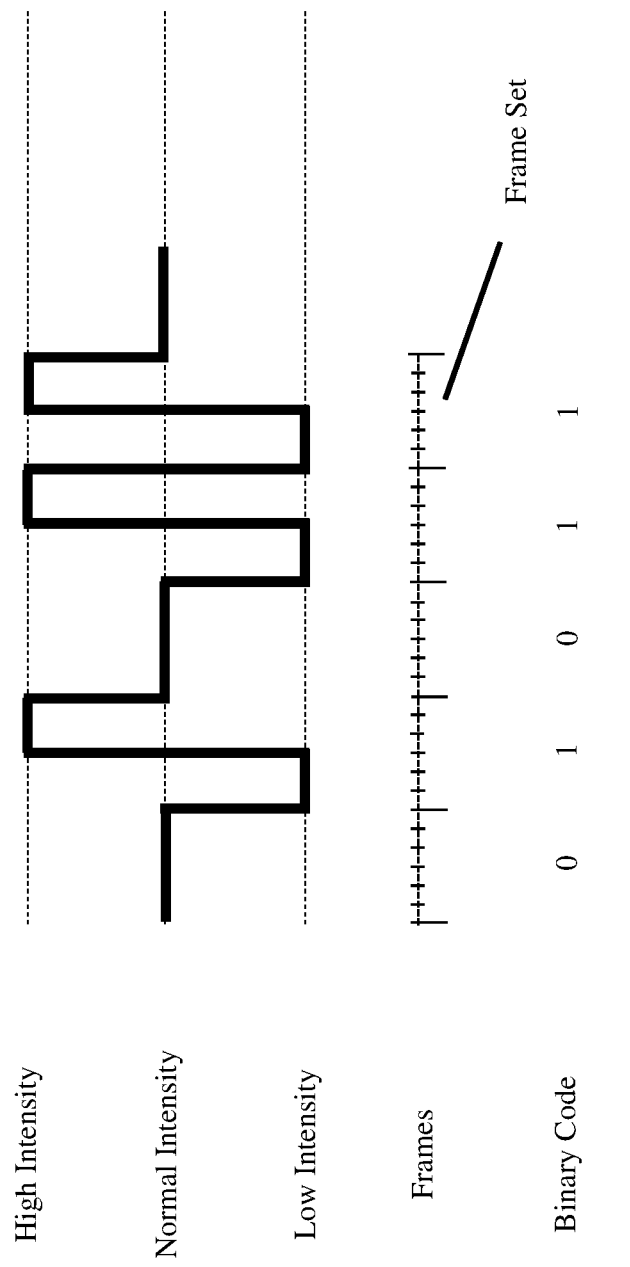
FIG. 3 illustrates an example recorded light intensity signal measured in frames.

An optional example implementation will now be described. In this example, a marker LED emits infrared light at three different intensity levels: Normal (e.g., 2.5 volts applied), High (e.g., 5 volts applied), and Low (1.25 volts applied), as illustrated in FIG. 2. A "0" code in the 5-bit binary encoding corresponds to an infrared light intensity detected and/or measured at a Normal intensity emission during a clock period. A Normal intensity emission may be considered a default code value. A "1" code in the 5-bit binary encoding corresponds to an infrared light intensity transition from a detected and/or measured Low intensity to a High intensity or an "upstroke". Advantageously, using a binary code defined by a state transition may obviate the need to determine absolute High or Low intensity states, where such determination may be difficult when tracking a moving subject/object where the movement itself generates light intensity variations. FIG. 3 and the description below illustrates how a detected/measured PMW infrared LED signal of varying emission intensities may be decoded into a 5-bit binary code.

Time/Clock Period 1. An LED marker begins and ends a first time period at a Normal intensity emission state. This corresponds to a "0" bit.

Time/Clock Period 2. The intensity of the LED marker drops to a Low intensity emission at the beginning of the second time period followed by an upstroke to a High intensity emission before the end of the second time period. The measured upstroke state transition corresponds to a "1" bit.

Time/Clock Period 3. The intensity of the LED marker begins and ends the third time period at a Normal intensity emission state. This corresponds to a "0" bit.

Time/Clock Period 4. At the beginning of the fourth time period, the intensity of the LED marker drops to a Low intensity emission (from a Normal intensity), followed by an upstroke from the Low intensity to a High intensity emission at the end of the fourth period. This corresponds to a "1" bit.

Time/Clock Period 5. At the beginning of the fifth time period, the intensity of the LED marker drops to a Low intensity emission (from a High intensity) followed by an upstroke to a High intensity emission at the end of the fifth period. This corresponds to "1" bit.

The assembled 5-bit binary code in this illustrative example of FIG. 3 is "01011" which corresponds to marker identity number "6" in this example (see Table 1.)

Determining a position of one or more distinct markers based upon the recorded video images involves certain challenges. Position and identification determinations may be computationally intensive. In addition, the determination of marker positions must be performed in a timely manner to enable a lifelike experience for observers and participants of the simulation. System delays in determining tracking positions may create a sub-optimal, unrealistic, headache inducing, and/or sluggish simulation experience. Therefore, it is desirable that the marker measurement and/or detection system used to determine marker tracking positions and identities be as computationally as efficient as possible to create a lifelike simulation. Another challenge in a marker measurement and/or detection system is a lost signal caused by a dropped frame(s) and/or the occultation/obstruction of an LED. Missing tracking information may cause a simulation to appear jerky and/or non-continuous. Thus, it is desirable that the marker position and identification technique also be robust with respect to signal loss by enabling, for example, frame error correction.

Figure 4:
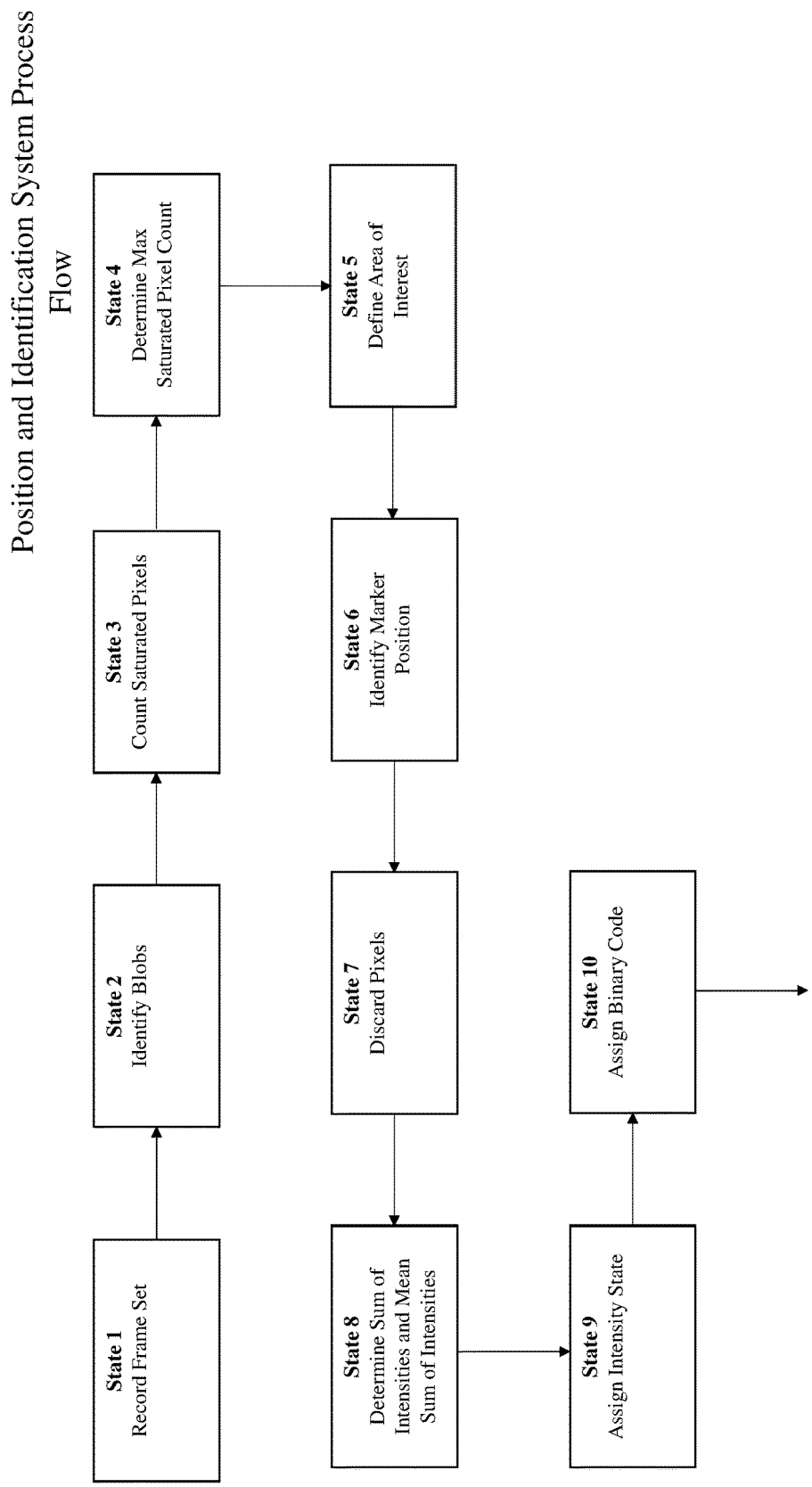
FIGS. 4-5 illustrate a process of an example embodiment of a marker identification and position tracking system.
Figure 5:
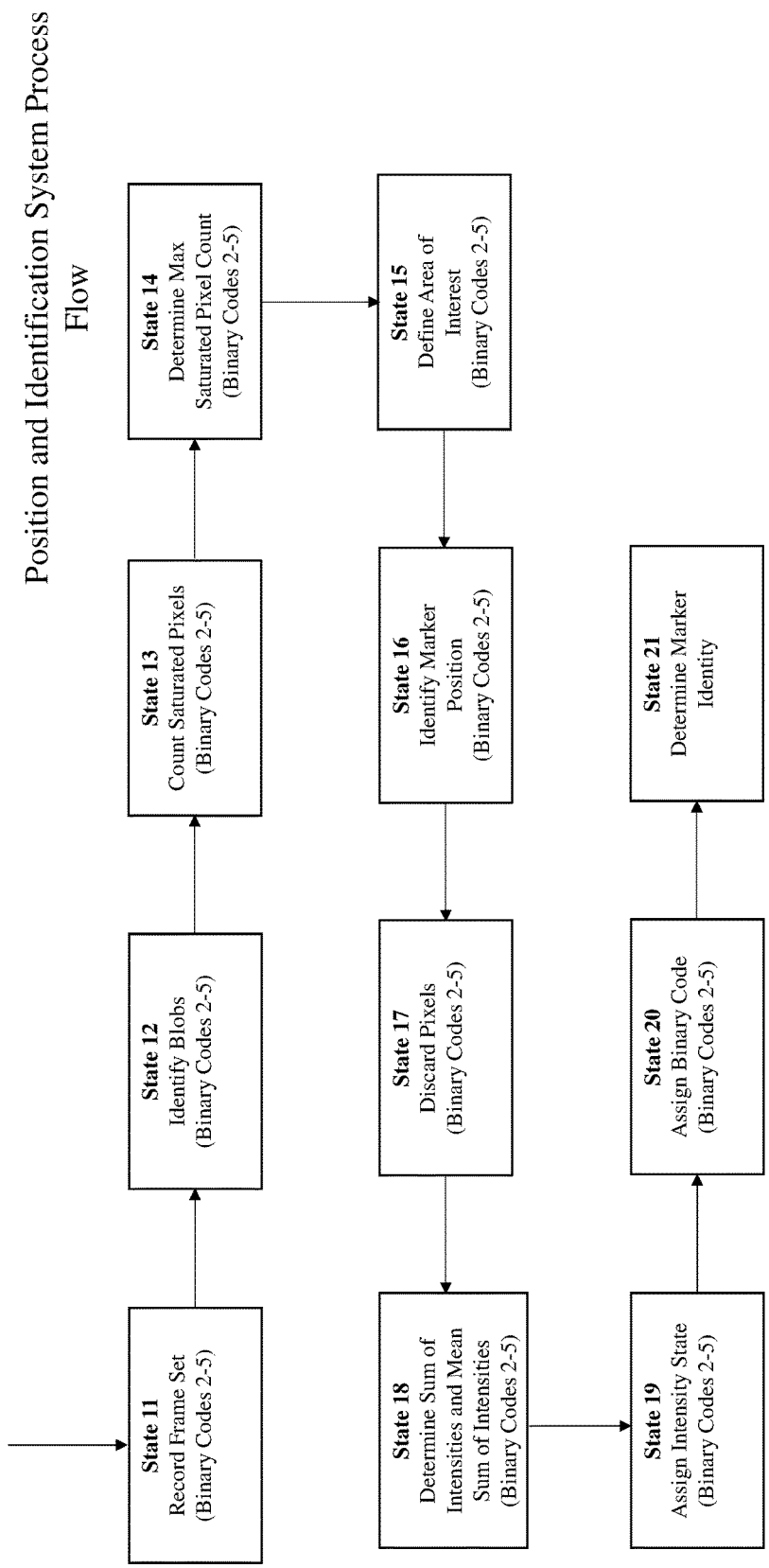

An example system for marker position and identification is now described. As described above, a marker tracking device may include one or more markers, a given marker comprised of an LED which emits an infrared signal (e.g., a binary encoded pattern). The infrared signal emitted by the one or more markers is video recorded by one or more motion tracking cameras 110-140 in a physical tracking area 100. The cameras 110-140 and/or a separate computing device 170 perform certain operations on recorded images as described herein below to determine a position of a given marker. The position tracking by a given camera and/or a computing device enables substantially real-time synchronized movement of a subject/object to be displayed to a user, participant, operator, and/or observer in a simulation, including a virtual reality or augmented reality simulation. The system for marker position determination and identification may be used in a single marker or in multiple marker simulation scenarios. The states listed below and illustrated in a flow chart in FIG. 4 and FIG. 5 need not be executed in the order shown nor do all of the steps need to be performed or reached.

State 1. A given motion tracking camera 110-140 of the marker position and identification system records and stores in memory a series of images or frames over a period of time or clock period. In this example embodiment, the cameras record six image frames for each binary code, herein after referred to as a frame set. A "0" binary code consists of six Normal intensity frames and a "1" binary code consists of three Low intensity frames and three High intensity frames. As previously described herein, a string of five binary codes creates a signal (e.g., a 5-bit binary encoded signal) which may be used to uniquely identify a marker. In the event of a missed or dropped frame in a frame set, the missing frame may be filled with either the preceding or the subsequent frame. Optionally, if two frames are missing or dropped in a frame set, a new frame set is started. Thus, at least with respect to a single missed frame, the marker detection and/or measurement system described herein includes an error detection and recovery feature.

State 2. The marker position and identification system identifies, in a given frame of a frame set, one or more infrared blobs or marker blobs (e.g., a collection of adjacent pixels of various intensity containing recorded infrared light associated with a marker).

State 3. The marker position and identification system determines, for a given marker blob, in a given frame of the frame set, the number of saturated pixels and stores said saturated pixel counts for a given frame in memory.

State 4. The marker position and identification system compares the saturated pixel count for a given marker blob across a frame set (e.g., across each frame in the frame set) to determine the maximum saturated pixel count for each marker blob in each frame set.

State 5. The marker position and identification system determines an area of interest for a given marker blob, within a given frame, wherein the area of interest is optionally defined as bounded by a perimeter, such as a circle. A given circle radius may be determined using a pixel factor times the saturated pixel count corresponding to a given marker blob in the frame. Experimentally it has been determined that a pixel factor of 15 defines a good area of interest, although other pixel factors may be used. An example radius of an area of interest circle is 15 pixels or more. A given circle (area of interest) is "placed" over a marker blob in a manner which encompasses the highest number of maximum intensity pixels.

State 6. For a given marker blob in a frame, the center point of the placed circle is stored by the marker position and identification system. The stored center point corresponds to a position in space for a marker, the identity for which may be determined as follows:

State 7. Optionally before determining the light emission intensity of a frame, the marker position and identification system discards certain pixels from a given marker blob in a given frame. The number of pixels discarded may be the determined maximum number of saturated pixels for the corresponding marker blob within the frame set. Thus, for a given frame and for a given marker blob within the frame, the marker position and identification system may discard the brightest/highest intensity pixels within the area of interest (e.g., beginning with saturated pixels, if any) and may end when the maximum saturated frame set pixel count for the corresponding infrared blob has been reached.

State 8. For a given frame in a frame set, the marker position and identification system sums the remaining infrared pixels' intensities in the determined circular area of interest of a given infrared blob to determine its intensity. Optionally, certain infrared pixels below a certain specified noise threshold may be removed prior to the determination of the sum of intensity. The determined sum of intensities for a given infrared blob on a given frame is stored in memory. Further, for the given frame set, the system determines an arithmetic mean sum of intensities to determine an intensity value for an infrared blob. For example, the system may determine an arithmetic mean sum by adding the value of the determined sum of intensities of the frame set and dividing by the number frames in the frame set. Other statistical techniques (e.g., other central tendency that describes the way in which a group of data clusters around a central value, such as mode, median, or averaging) may be used to determine an intensity for an infrared blob.

State 9. For a given frame in a frame set, the marker positioning and identification system compares the determined sum of intensities of a given infrared blob with the determined mean sum of intensities of the frame set and assigns an intensity state to a given frame: Low, Normal, or High, for example. The determined intensity state of a given infrared blob for a given frame in the frame set is stored in memory. If a given frame sum of intensities exceeds the determined mean sum of intensities for the frame set by a threshold amount (e.g., within a threshold percentage, such as 10 percent, 15 percent, 20 percent, etc.) the frame is considered by the system to be in a High intensity state. If the frame sum of intensities is below the mean sum of intensities intensity by a predetermined or dynamically determined threshold amount (e.g., within a threshold percentage, such as 10 percent, 15 percent, 20 percent, etc.) the frame is considered by the system to be to be in a Low intensity state. If the frame sum of intensities is approximately equivalent to the mean sum of intensities (e.g., within a specified range of the mean sum of intensities, such as plus or minus 5 percent, plus or minus 10 percent, plus or minus 15 percent, plus or minus 20 percent, etc.) the frame is considered by the system to be to be at a Normal intensity state. As similarly discussed above, instead of or in addition to comparing sum of intensities to a mean sum of intensities for a given frame, benchmark sum of intensities, median sum of intensities, mode sum of intensities, or other sum of intensities may be used in the compared to determine a frame intensity level.

State 10. The marker positioning and identification system compares the assigned intensities of a given frame set to determine whether a frame set corresponds to a binary code of "0" or "1" wherein a "0" binary code in this example embodiment consists of six consecutive Normal intensity frames and a "1" binary code consists of three Low intensity frames followed by three High intensity frames (e.g., an upstroke) (although more or less frames may be used in the binary code determination). Optionally, other combinations and sequences of frame set intensities may be used to determine a binary code. For example, a given marker may be configured to be associated with a "1" binary code represented by three High intensity frames followed by three Low intensity frames (e.g., a down stroke.) The determined binary code for a given infrared blob is stored by the marker position and identification system in memory.

States 11-20. Repeat states 1 through 10 (e.g., four additional times) until a 5-bit binary code is assembled for a given marker blob.

State 21. The marker positioning and identification system compares the resulting 5-bit binary code to a table of marker identifiers associated with each unique 5-bit binary code (see, for example, Table. 1) to determine the marker identity of a given measured and/or detected infrared blob and stores the comparison results in computer memory.

Optionally, the resulting stored marker identities (e.g., from State 21) and marker positions (e.g., from State 6) are provided to one or more computing devices providing a virtual or augmented reality simulation. Optionally, the one or more computing devices combine the output of a plurality of cameras to determine marker positions in three dimensional space. Optionally, the determined identity of two associated markers (e.g., a PPT Eyes tracking device) together with their positions may be used to determine object and/or user movement to which the markers are attached in five degrees of freedom with two axis of rotation.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals and other computing devices described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A marker identification system comprising:
a motion tracking camera, wherein the motion tracking camera is configured to detect infrared light;
a marker, the marker configured to emit a pattern of infrared light pulses that encodes 5 or more binary bits;
a computing system comprising:
a computing device; and
non-transitory media that stores instructions readable by the computing device, that when executed by the computing device, cause the computing system to:
record via the motion tracking camera a plurality of images including at least a first recorded image set, a second recorded image set, a third recorded image set, a fourth recorded image set, and a fifth recorded image set;
identify, within a given recorded image of the first recorded image set, a cluster of adjacent pixels corresponding to infrared light emitted from the marker;
determine a count of how many saturated pixels are within a given identified cluster of adjacent pixels of a given recorded image of the first recorded image set;
determine a highest count of saturated pixels from respective counts of saturated pixels of respective given identified clusters of respective given recorded images of the first recorded image set;
calculate a radius for a circular perimeter by at least multiplying the highest count of saturated pixels by a first factor; identify a first area, bounded by the circular perimeter, of a first image of the first recorded image set encompassing a highest number of infrared light pixels within a cluster of adjacent pixels;
for pixels within the first area, identify a first set of pixels having a highest intensity as compared to other sets of pixels in the first area, wherein the first set of pixels has a count equal to the highest count of saturated pixels;
excluding the first set of pixels, determine a sum of infrared light intensities of the first area;
determine respective sum of infrared light intensities for respective areas in the remaining one or more images of the first recorded image set;
based at least in part on the determined respective sum of infrared light intensities of the respective areas of respective images of the first recorded image set, assign a binary value to the first recorded image set;
determine respective sum of infrared light intensities for respective areas in at least the second recorded image set, the third recorded image set, the fourth recorded image set, and the fifth recorded image set;
based at least in part on the determined respective sum of infrared light intensities for respective areas in the second recorded image set, the third recorded image set, the fourth recorded image set, and the fifth recorded image set, assign a respective binary value to the respective second recorded image set, third recorded image set, fourth recorded image set, and fifth recorded image set;
compare the respective assigned binary values to the configured pattern of infrared light pulses of the marker; and
based at least in part on the comparison of the respective assigned binary values to the configured pattern of infrared light pulses of the marker, identify the marker.

2. The marker identification system of claim 1, wherein a position in space of the marker in a first recorded image corresponds to a center of a respective area of the first recorded image bounded by the circular perimeter.

3. The marker identification system of claim 1, wherein a respective recorded image set comprises multiple frames.

4. The marker identification system of claim 1, wherein the marker is user configurable to emit a plurality of infrared light pulses patterns corresponding to a plurality of binary code sets.

5. The marker identification system of claim 1, further comprising a plurality of markers configured to be attached to a user to enable at least in part, the marker identification system to determine a corresponding orientation of the user.

6. The marker identification system of claim 1, wherein the marker is configured to be attached to a user to enable at least in part, the marker identification system to determine a corresponding position of the user.

7. The system of claim 1, wherein the instructions are further configured to cause the computing device to determine if the respective sum of infrared light intensities for the respective areas of respective images of the recorded image sets correspond to a set of consecutive images of medium intensities.

8. The system of claim 1, wherein the instructions are further configured to cause the computing device to determine if the respective sum of infrared light intensities for the respective areas of respective images of the recorded image sets corresponds to a set of consecutive images of low intensities followed by a set of consecutive images of high intensities.

9. A system comprising:
a motion tracking camera, wherein the motion tracking camera is configured to detect infrared light;
a marker, the marker configured to emit a binary pattern of infrared light pulses that encodes one or more binary bits;
a computing system comprising:
a computing device; and
non-transitory media that stores instructions readable by the computing device, that when executed by the computing device, cause the computing device to:
record via the motion tracking camera a plurality of images;
identify, within a given recorded image, a cluster of adjacent pixels corresponding to infrared light emitted from the marker;
determine a count of how many saturated pixels are within a given identified cluster of adjacent pixels of a given recorded image;
determine a highest count of saturated pixels from respective counts of saturated pixels of respective given identified clusters of respective given recorded images;
calculate a radius for a circular perimeter by at least multiplying the highest count of saturated pixels by a first factor;
identify a first area, bounded by the circular perimeter, of a first image of the plurality of images encompassing a highest number of infrared light pixels within a cluster of adjacent pixels;
for pixels within the first area, identify a first set of pixels having a highest intensity as compared to other sets of pixels in the first area, wherein the first set of pixels has a count equal to the highest count of saturated pixels;
excluding the first set of pixels, determine a sum of infrared light intensities of the first area;
determine respective sum of infrared light intensities for respective areas in the remaining one or more images of the plurality of images; and
based at least in part on the determined respective sum of infrared light intensities of the respective areas of respective images of the plurality of images,
assign a binary value to the plurality of images.

10. The system of claim 9, wherein the instructions are further configured to cause the computing device to determine if the respective sum of infrared light intensities for the respective areas of the respective images of the plurality of images correspond to a set of consecutive images of medium intensities.

11. The system of claim 9, wherein the instructions are further configured to cause the computing device to determine if the respective sum of infrared light intensities for the respective areas of the respective images of the plurality of images corresponds to a set of consecutive images of low intensities followed by a set of consecutive images of high intensities.

12. The system of claim 9, wherein a position in space of the marker in a given image corresponds to a center of a respective area bounded by the circular perimeter.

13. The system of claim 9, wherein the marker is user configurable to generate a plurality of distinguishable infrared light pulses patterns corresponding to a binary code set.

14. The system of claim 9, further comprising a plurality of markers, wherein the plurality of markers are configured to be attached to a user to enable at least in part, the system to determine a corresponding orientation of the user.

15. The system of claim 9, wherein the marker is configured to be attached to a user to enable at least in part, the system to determine a corresponding position of the user.

16. The system of claim 9, the system further configured to combine the binary value with other assigned binary values to a respective subsequent plurality of recorded images to define a binary code set.

17. The system of claim 9, the system further configured to: combine the binary value with other assigned binary values to a respective subsequent plurality of recorded images to define a binary code set; compare the defined binary code set to configured binary values of the marker; and based at least in part on the comparison of the defined binary code set to the configured binary values of the marker, identify the marker.

18. A method of marker identification comprising:
identifying, within a given recorded image of a plurality of images captured by a camera, a cluster of adjacent pixels corresponding to infrared light emitted from a marker;
determining a count of how many saturated pixels are within a given identified cluster of adjacent pixels of a given recorded image of the plurality of images;
determining a highest count of saturated pixels from respective counts of saturated pixels of respective given identified clusters of respective given recorded images;
calculating a radius for a circular perimeter by at least multiplying the highest count of saturated pixels by a first factor;
identifying a first area, bounded by the circular perimeter, of a first image of the plurality of images encompassing a highest number of infrared light pixels within a cluster of adjacent pixels;
for pixels within the first area, identifying a first set of pixels having a highest intensity as compared to other sets of pixels in the first area, wherein the first set of pixels has a count equal to the highest count of saturated pixels;
excluding the first set of pixels, determining a sum of infrared light intensities of the first area;
determining respective sum of infrared light intensities for respective areas in the remaining one or more images of the plurality of images; and
based at least in part on the determined respective sum of infrared light intensities of the respective areas of respective images of the plurality of images,
assigning a binary value to the plurality of images.

19. The method of claim 18, the method further comprising: determining if the respective sum of infrared light intensities for the respective areas of the respective images of the plurality of images correspond to a set of consecutive images of medium intensities.

20. The method of claim 18, the method further comprising: determining if the respective sum of infrared light intensities for the respective areas of the respective images of the plurality of images corresponds to a set of consecutive images of low intensities followed by a set of consecutive images of high intensities.

\* \* \* \* \*